US009241191B2

(12) United States Patent
Shim (10) Patent No.: US 9,241,191 B2
(45) Date of Patent: Jan. 19, 2016

(54) METHOD FOR AUTO-SETTING CONFIGURATION OF TELEVISION TYPE AND TELEVISION USING THE SAME

(75) Inventor: Jae-young Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 13/425,771

(22) Filed: Mar. 21, 2012

(65) Prior Publication Data

US 2012/0176544 A1 Jul. 12, 2012

Related U.S. Application Data

(63) Continuation of application No. 12/732,230, filed on Mar. 26, 2010.

(30) Foreign Application Priority Data

Jul. 7, 2009 (KR) .................................. 200961493

(51) Int. Cl.
| H04N 5/45 | (2011.01) |
| G06F 3/048 | (2013.01) |
| H04N 5/445 | (2011.01) |
| H04N 21/472 | (2011.01) |
| H04N 5/60 | (2006.01) |
| H04N 21/431 | (2011.01) |

(Continued)

(52) U.S. Cl.
CPC ......... *H04N 21/47205* (2013.01); *H04N 5/602* (2013.01); *H04N 21/4312* (2013.01); *H04N 21/4314* (2013.01); *H04N 21/44222* (2013.01); *H04N 21/4858* (2013.01)

(58) Field of Classification Search
CPC ............ H04N 21/47205; H04N 5/602; H04N 21/4312; H04N 21/4314; H04N 21/44222; H04N 21/4858
USPC ............ 715/808, 764, 716; 348/563, E5.099, 348/E5.112
See application file for complete search history.

(56) References Cited

U.S. PATENT DOCUMENTS

| 5,359,158 | A | * | 10/1994 | Queen ........................... 181/150 |
| 5,381,482 | A | * | 1/1995 | Matsumoto et al. ............ 381/18 |
| 5,805,167 | A | * | 9/1998 | van Cruyningen ... G06F 3/0482 |
| | | | | 715/808 |

(Continued)

FOREIGN PATENT DOCUMENTS

| EP | 1124175 A2 | 8/2001 |
| EP | 2037678 A1 | 3/2009 |

(Continued)

OTHER PUBLICATIONS

Adjusting Sony's TV (see http://zicelectronic.blogspot.com/2009/01/adjusting-sonys-tv.html; dated Jan. 25, 2009; last accessed Jan. 17, 2014).*

(Continued)

*Primary Examiner* — Jessica Chuang
(74) *Attorney, Agent, or Firm* — Sughrue Mion, PLLC (57) ABSTRACT

Provided is a method for auto-setting a configuration of a television (TV) based on a TV installation type, and a TV using the same. The present method for auto-setting configuration may set a TV configuration based on a TV installation type input via a GUI which receives a TV installation type. Accordingly, a TV configuration such as audio parameters may be automatically set according only to the TV installation type.

11 Claims, 4 Drawing Sheets

(51) Int. Cl.
*H04N 21/442* (2011.01)
*H04N 21/485* (2011.01)

(56) References Cited

U.S. PATENT DOCUMENTS

| | | | | |
|---|---|---|---|---|
| 6,188,442 | B1* | 2/2001 | Narayanaswami | 348/564 |
| 6,263,502 | B1* | 7/2001 | Morrison et al. | 725/47 |
| 6,359,994 | B1* | 3/2002 | Markow et al. | 381/333 |
| 6,479,742 | B1* | 11/2002 | Torii | H03G 5/005 381/58 |
| 6,543,052 | B1* | 4/2003 | Ogasawara | 725/60 |
| 6,577,738 | B2* | 6/2003 | Norris et al. | 381/77 |
| 6,607,136 | B1* | 8/2003 | Atsmon et al. | 235/492 |
| 6,738,479 | B1* | 5/2004 | Sibbald et al. | 381/17 |
| 6,801,628 | B1* | 10/2004 | Thiel | H04S 1/00 381/56 |
| 6,823,310 | B2* | 11/2004 | Ishito | G10L 21/04 348/E5.123 |
| 6,904,610 | B1* | 6/2005 | Bayrakeri | H04N 5/232 348/E5.042 |
| 6,925,186 | B2* | 8/2005 | Bacon | 381/119 |
| 6,982,649 | B2* | 1/2006 | Blum et al. | 340/815.4 |
| 6,990,211 | B2* | 1/2006 | Parker | 381/310 |
| 7,099,483 | B2* | 8/2006 | Inagaki | 381/77 |
| 7,103,194 | B2* | 9/2006 | Hsia | 381/388 |
| 7,197,562 | B2* | 3/2007 | Murtha et al. | 709/224 |
| 7,298,853 | B2* | 11/2007 | Norris et al. | 381/77 |
| 7,327,402 | B2* | 2/2008 | Kim | 348/555 |
| 7,379,552 | B2* | 5/2008 | Neervoort et al. | 381/58 |
| 7,386,137 | B2* | 6/2008 | Combest | 381/182 |
| 7,690,792 | B2* | 4/2010 | Matsuzawa | 353/15 |
| 7,706,838 | B2* | 4/2010 | Atsmon et al. | 455/558 |
| 7,733,294 | B2* | 6/2010 | Unger | 345/2.3 |
| 7,930,644 | B2* | 4/2011 | Silva | H04L 12/2809 715/771 |
| 7,958,537 | B2* | 6/2011 | Baek | H04N 5/4401 348/563 |
| 8,050,535 | B2* | 11/2011 | Sato | A63F 13/02 345/419 |
| 8,099,666 | B2* | 1/2012 | Lee | G06F 3/0219 715/708 |
| 8,116,081 | B2* | 2/2012 | Crick, Jr. | 361/724 |
| 8,238,598 | B2* | 8/2012 | Lee | 381/388 |
| 8,274,611 | B2* | 9/2012 | DeMartin | H04N 5/60 348/569 |
| 8,280,076 | B2* | 10/2012 | Devantier et al. | 381/99 |
| 8,290,197 | B2* | 10/2012 | Buining et al. | 381/394 |
| 8,363,095 | B2* | 1/2013 | Mitani et al. | 348/56 |
| 8,363,161 | B2* | 1/2013 | Pearlstein | H04N 21/2368 348/515 |
| 8,422,688 | B2* | 4/2013 | Oh et al. | 381/20 |
| 8,427,589 | B2* | 4/2013 | Fratti | H04N 21/8106 348/553 |
| 8,532,306 | B2* | 9/2013 | Oh et al. | 381/22 |
| 8,553,153 | B2* | 10/2013 | De Vaan et al. | 348/602 |
| 8,953,825 | B2* | 2/2015 | Lim et al. | H04R 3/04 381/306 |
| 2001/0024505 | A1* | 9/2001 | Torii et al. | 381/123 |
| 2003/0007001 | A1* | 1/2003 | Zimmerman | 345/716 |
| 2003/0191836 | A1* | 10/2003 | Murtha et al. | 709/224 |
| 2004/0080213 | A1* | 4/2004 | Chang | 307/10.1 |
| 2004/0114770 | A1* | 6/2004 | Pompei | 381/77 |
| 2004/0131206 | A1* | 7/2004 | Cao | H03G 5/005 381/103 |
| 2004/0151325 | A1* | 8/2004 | Hooley et al. | 381/18 |
| 2004/0156512 | A1* | 8/2004 | Parker | 381/74 |
| 2004/0169722 | A1* | 9/2004 | Pena | 348/14.01 |
| 2004/0184619 | A1* | 9/2004 | Inagaki | 381/77 |
| 2005/0047760 | A1* | 3/2005 | Nakatani | G11B 27/105 386/344 |
| 2005/0063554 | A1* | 3/2005 | Devantier et al. | 381/99 |
| 2005/0213761 | A1* | 9/2005 | Walmsley et al. | 380/255 |
| 2006/0052962 | A1* | 3/2006 | Shipton et al. | 702/106 |
| 2006/0062401 | A1* | 3/2006 | Neervoort et al. | 381/82 |
| 2006/0071951 | A1* | 4/2006 | Walmsley et al. | 347/5 |
| 2006/0071981 | A1* | 4/2006 | Plunkett | 347/59 |
| 2006/0082609 | A1* | 4/2006 | Walmsley et al. | 347/14 |
| 2006/0098827 | A1* | 5/2006 | Paddock et al. | 381/106 |
| 2006/0210090 | A1* | 9/2006 | Shennib | A61B 5/121 381/67 |
| 2006/0244863 | A1* | 11/2006 | Baikie et al. | 348/569 |
| 2007/0006150 | A9* | 1/2007 | Walmsley | 717/120 |
| 2007/0016435 | A1* | 1/2007 | Bevington | 705/1 |
| 2007/0245373 | A1* | 10/2007 | Shivaji-Rao et al. | 725/35 |
| 2007/0260988 | A1* | 11/2007 | Miller | 715/744 |
| 2008/0055548 | A1* | 3/2008 | Matsuzawa | B06B 1/0603 353/15 |
| 2009/0015799 | A1* | 1/2009 | Luciano | 353/79 |
| 2009/0067664 | A1* | 3/2009 | Lim | 381/388 |
| 2009/0077271 | A1* | 3/2009 | Kaag | 710/10 |
| 2009/0089675 | A1* | 4/2009 | Han | 715/716 |
| 2009/0125939 | A1* | 5/2009 | Huang | 725/39 |
| 2009/0147980 | A1* | 6/2009 | Fincham | 381/352 |
| 2009/0238384 | A1* | 9/2009 | Beauchamp | 381/306 |
| 2010/0042925 | A1* | 2/2010 | DeMartin et al. | 715/716 |
| 2010/0195549 | A1* | 8/2010 | Aragon et al. | 370/311 |
| 2010/0241438 | A1* | 9/2010 | Oh et al. | 704/500 |
| 2010/0250259 | A1* | 9/2010 | Oh et al. | 704/500 |
| 2010/0272309 | A1* | 10/2010 | Buining et al. | 381/394 |
| 2010/0296234 | A1* | 11/2010 | Crick, Jr. | 361/679.21 |
| 2010/0298026 | A1* | 11/2010 | Goodman | H04M 1/72583 455/552.1 |
| 2010/0317332 | A1* | 12/2010 | Bathiche et al. | 455/418 |
| 2010/0328533 | A1* | 12/2010 | Mitani et al. | 348/521 |
| 2011/0063526 | A1* | 3/2011 | Yamamoto et al. | 348/739 |
| 2011/0074850 | A1* | 3/2011 | Walmsley et al. | 347/12 |
| 2011/0157493 | A1* | 6/2011 | Lefevre et al. | 348/836 |
| 2012/0250600 | A1* | 10/2012 | Aragon et al. | 370/311 |
| 2013/0332355 | A1* | 12/2013 | Atsmon et al. | 705/41 |
| 2014/0122674 | A1* | 5/2014 | Gray et al. | 709/222 |
| 2015/0019250 | A1* | 1/2015 | Goodman | H04N 21/4227 705/2 |

FOREIGN PATENT DOCUMENTS

| | | |
|---|---|---|
| JP | 2006-109284 A | 4/2006 |
| JP | 2008205610 A | 9/2008 |
| KR | 2000-0009501 A | 2/2000 |
| KR | 1020090027101 A | 3/2009 |
| KR | 1020090032658 A | 4/2009 |
| WO | 02/100092 A1 | 12/2002 |

OTHER PUBLICATIONS

Sceptre X32 HDTV User Manual (http://www.sceptre.com/pub/Manuals/X32GV-Komodo.pdf, dated Mar. 15, 2007, last accessed Oct. 31, 2014.*
Extended European Search Report, dated Aug. 31, 2010, issued in application No. 1015797.8.
Communication dated Nov. 7, 2011 issued by the European Patent Office in counterpart European Patent Application No. 10157949.8.
Communication dated Jun. 15, 2012 issued by the Korean Patent Office in counterpart Korean Patent Application No. 1020090061493.
Communication issued Jul. 10, 2012 by the European Patent Office in counterpart European Application No. 10157949.8.
Communication dated May 27, 2014, issued by the European Patent Office in counterpart European Application No. 10157949.

* cited by examiner

METHOD FOR AUTO-SETTING CONFIGURATION OF TELEVISION TYPE AND TELEVISION USING THE SAME

CROSS-REFERENCE TO RELATED APPLICATIONS

This is a Continuation Application of application Ser. No. 12/732,230, filed Mar. 26, 2010, which claims priority from Korean Patent Application No. 2009-0061493, filed in the Korean Intellectual Property Office on Jul. 7, 2009, the disclosures of which are incorporated herein by reference.

BACKGROUND OF THE INVENTION

1. Field of the Invention

Aspects of exemplary embodiments of the present invention relate to a method for setting up configuration of a television and a television using the same, and more particularly, to a method for auto-setting a configuration of a television, and a television using the same.

2. Description of the Related Art

A flat panel display television (TV) or similar display may be installed in a variety of configurations, such as on a stand or a wall mount. As flat panel displays are becoming thinner and lighter, a user may wish to change an installation type of a flat display TV.

SUMMARY OF THE INVENTION

Aspects of exemplary embodiments of the present invention relate to a method for auto-setting configuration of a TV according to a TV installation type that may be input via a graphical user interface (GUI) in order to set the configuration of the TV, and a TV using the same.

A method for auto-setting configuration, according to an exemplary embodiment of the present invention, may comprise providing a GUI to receive a TV installation type and setting TV configuration based on the TV installation type input via the GUI.

The TV configuration may be audio output configuration of the TV. The TV audio output configuration may include Parametric Equalization (PEQ).

The TV installation type may include at least two of a wall-mount type, a stand-type, and a ceiling-mount type.

At least one audio output configuration setting value may be designated for each TV installation type, and the setting may set the audio output configuration according to one of 'at least one audio output configuration setting value designated for the TV installation type input via the GUI.'

The setting may comprise outputting audio according to an audio output configuration setting value selected by a user from among the 'at least one audio output configuration setting value designated for the TV installation type input via the GUI' and setting the audio output configuration according to the audio output configuration setting value selected by the user, if the user confirms the output.

A GUI may be provided in at least one of the following exemplary cases, that is, when a user requests the GUI, when the TV is turned on for the first time after its power plug is removed from an outlet and is connected again, when a user requests a GUI regarding audio for the first time, when the TV is turned on for the first time after being shipped out of the factory, and when a user requests a self diagnosis guide screen.

A GUI may be provided in a pop-up window if, for example, the TV is turned on for the first time for the first time after its power plug is removed from an outlet and is connected again, and if the user requests a GUI regarding audio for the first time.

The TV audio output configuration setting value of the TV installation type may be stored in the TV, such as before being shipped out of the factory, prior to installation, after being received via a broadcast reception medium, after being received via a network connected to the TV, after being received from an external apparatus connected to the TV, or after being received from a storage medium connected to the TV.

The exemplary embodiments of methods for auto-setting configuration may further comprise providing a GUI to receive TV installation status and setting audio output configuration of the TV based on the TV installation state input via the GUI.

The TV installation state may include at least one of a distance between the TV and the wall and a distance between the TV and another surface, such as the floor.

Exemplary embodiments of methods for auto-setting configuration may further comprise sensing the TV installation type and setting audio output configuration of the TV based on the sensed TV installation type.

A TV, according to an exemplary embodiment of the present invention, may comprise a generation unit to generate a GUI to be displayed on a display, and a control unit to control the generation unit to generate a GUI for receiving a TV installation type and to set the TV configuration based on the TV installation type input via the GUI.

The TV configuration may be audio output configuration of the TV.

Exemplary embodiments may comprise at least one audio output configuration setting value designated for each TV installation type, and the control unit may set the audio output configuration according to one of 'at least one audio output configuration setting value designated for the TV installation type input via the GUI.'

The control unit may control the generation unit to generate the GUI in at least one of the following exemplary cases, that is, 1) when a user requests the GUI, 2) when the TV is turned on for the first time after its power plug is removed from an outlet and is connected again, 3) when a user requests a GUI regarding audio for the first time, 4) when the TV is turned on for the first time after being shipped out of the factory, and 5) when a user requests a self diagnosis guide screen.

The control unit may, for example, control the generation unit to generate the GUI in a pop-up window if power is turned on for the first time after a power plug of the TV is removed from an outlet and is connected again, and if the user requests the GUI regarding audio for the first time.

The TV audio output configuration setting value for the TV installation type may be stored in the TV, such as before being shipped out of the factory, prior to installation, after being received via a broadcast reception medium, after being received via a network connected to the TV, after being received from an external apparatus connected to the TV, or after being received from a storage medium connected to the TV.

The control unit may control the generation unit to generate a GUI to receive a TV installation state, and set audio output configuration of the TV based on the TV installation state input via the GUI.

The TV installation state may include at least one of a distance between the TV and the wall and a distance between the TV and another surface, such as the floor.

The TV may further include a sensing unit to sense the TV installation type and the control unit may set audio output configuration of the TV based on the TV installation type sensed by the sensing unit.

Additional aspects and/or advantages of exemplary embodiments of the invention will be set forth in part in the description which follows and, in part, may be obvious from the description, or may be learned by practice of the invention.

BRIEF DESCRIPTION OF THE DRAWINGS

These and/or other aspects of exemplary embodiments of the invention will become apparent and more readily appreciated from the following description of the embodiments, taken in conjunction with the accompanying drawings, of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to like elements throughout. The embodiments are described below, in order to explain aspects of exemplary embodiments of the present invention by referring to the figures.

Figure 1:
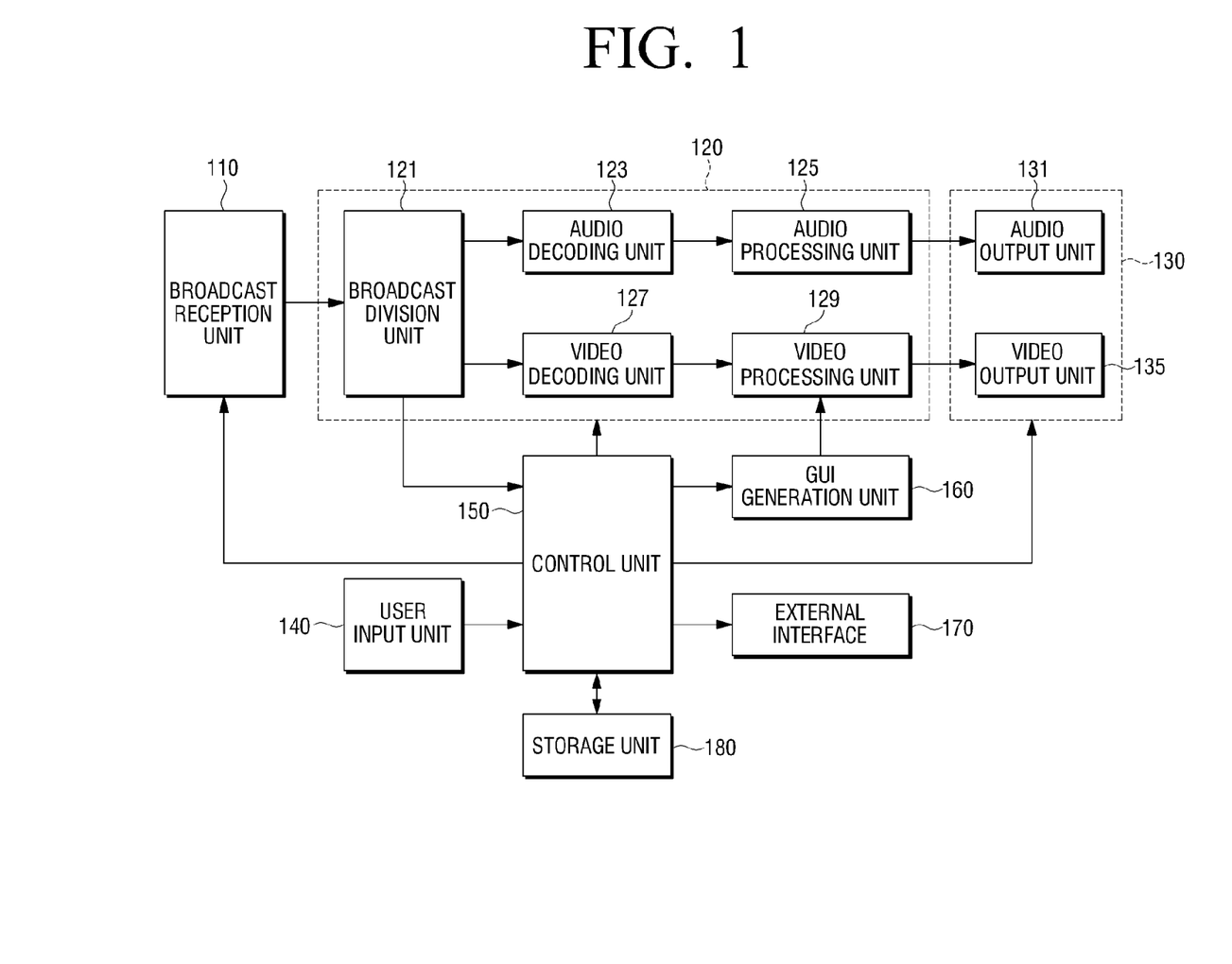
FIG. 1 is a block diagram illustrating a Digital TV (DTV), according to an exemplary embodiment of the present invention.

1. Configuration of a DTV According to an Exemplary Embodiment of the Present Invention FIG. 1 is a block diagram illustrating a Digital Television (DTV) according to an exemplary embodiment of the present invention. As illustrated in FIG. 1, the DTV may comprise a broadcast reception unit 110, a broadcast processing unit 120, a broadcast output unit 130, a user input unit 140, a control unit 150, a Graphical User Interface (GUI) generation unit 160, an external interface 170, and a storage unit 180.

The broadcast reception unit 110 may select one broadcast from among broadcasts received over the air or through cable with wire or wirelessly, and demodulates it. While the term "broadcast" is used, it will be readily understood by one skilled in the art that aspects of embodiments of the present invention may apply to a display for recorded or prerecorded content stored locally or remotely, such as content provided by a set-top-box, stored within the display unit, or stored in optical storage, magnetic storage, non-volatile memory, or another storage media.

The broadcast processing unit 120 may perform signal processing on a broadcast signal output from the broadcast reception unit 110. The broadcast processing unit 120 may comprise a broadcast division unit 121, an audio decoding unit 123, an audio processing unit 125, a video decoding unit 127, and a video processing unit 129.

The broadcast division unit 121 may divide a broadcast signal output from the broadcast reception unit 110 into an audio signal, a video signal, and an additional data, and outputs these signals. The audio signal and the video signal divided from the broadcast signal are applied to the audio decoding unit 123 and the video decoding unit 127 respectively, and may be used for providing a digital broadcast program. The additional data divided from the broadcast signal may be applied to the control unit 150, and the additional data may be metadata, such as Program and System Information Protocol (PSIP) information.

The audio decoding unit 123 may decode an audio signal output from the broadcast division unit 121. Accordingly, the audio decoding unit 123 may output a decompressed audio signal.

The audio processing unit 125 may convert a decoded audio signal output from the audio decoding unit 123 into an audio signal in an output format via a speaker in a DTV.

The video decoding unit 127 may decode a video signal output from the broadcast division unit 121. Accordingly, the video decoding unit 127 may output a decompressed video signal.

The video processing unit 129 may convert a decoded video signal output from the video decoding unit 127 into a video signal in an output format via a display on a DTV. In order for this, the video processing unit 129 may perform color signal processing and scaling on the decoded video signal in accordance with a format of the video signal and the DTV. While the current exemplary embodiment is described regarding a digital display television, it will be readily appreciated by one skilled in the art that aspects of exemplary embodiments of the present invention may be related to analog displays, plasma displays, liquid crystal displays, light emitting diode LED, organic LED, or other display devices.

The GUI generation unit 160 may generate a GUI to be displayed on a display under the control of the control unit 150. In particular, the GUI generation unit 160 may generate a GUI for inputting a DTV installation type.

The GUI generated by the GUI generation unit 160 may be applied to the video processing unit 129 and may be added to the video to be displayed on the display of the DTV.

The output unit 130 may output video and audio corresponding to the video signal and the audio signal output from the broadcast processing unit 120 and may provide them to a user. The output unit 130 may comprise an audio output unit 131 and a video output unit 135.

The audio output unit 131 may output an audio signal output from the audio processing unit 125 via a speaker, headphones, or other audio output, and the video output unit 135 may output a video signal output from the video processing unit 129 via a display.

The external interface 170 may connect an external apparatus (for example, a USB memory or a digital camera) to an external network (for example, Internet or LAN) so that two apparatuses may communicate with each other.

The storage unit 180 may be a recoding medium to store information necessary to perform DTV functions. In particular, the storage unit 180 may store data such as parametric Equalization (PEQ) setting values. The PEQ setting values may be stored separately for each DTV installation type. That is, the storage unit 180 may store, for example, 'PEQ-S, a PEQ setting value for stand type', and 'PEQ-W, a PEQ setting value for wall-mount type' separately, or may store them together.

The user input unit 140 may transmit a user command input through a remote controller or a manipulation button in a DTV front, side, or other panel, or input device to the control unit 150.

The control unit 150 may control overall operation of a DTV according to the user command received from the user input unit 140. Specifically, the control unit 150 may control the broadcast reception unit 110, the broadcast processing unit 120 and the broadcast output unit 130 so that the broadcast program selected by the user may be received and output.

In addition, the control unit 150 may control the GUI generation unit 160 so that a GUI for inputting a DTV installation type may be provided. The control unit 150 may set a PEQ setting value appropriate for the DTV installation type input by the user through the GUI. This process will be explained in detail with reference to FIG. 2.

2. Auto-Setting DTV Audio Configuration

Figure 2:
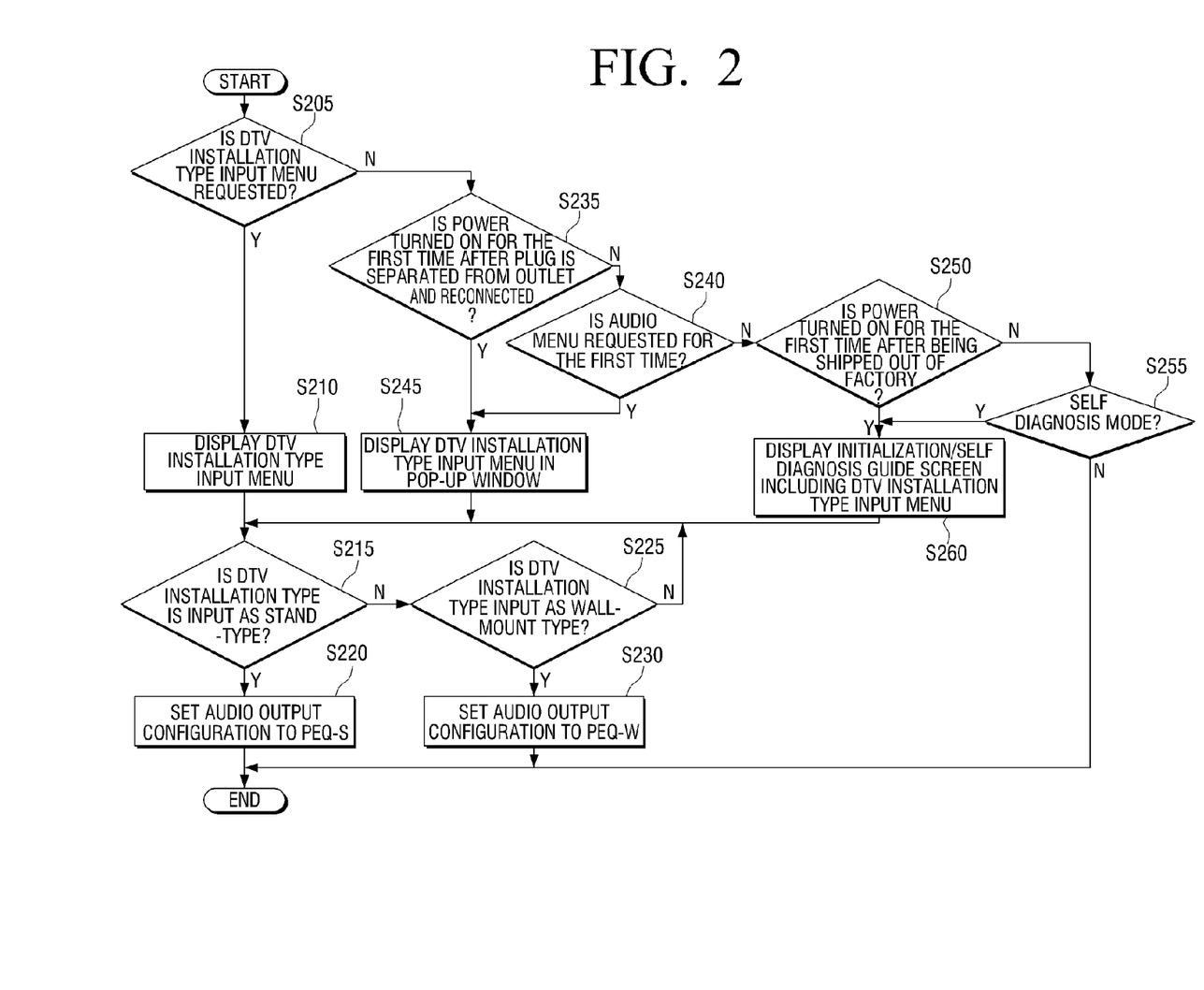
FIG. 2 is a flow chart provided to explain a method for auto-setting configuration of a DTV audio, according to an exemplary embodiment of the present invention.

FIG. 2 is a flow chart provided to explain a method for auto-setting configuration of a DTV audio according to an exemplary embodiment of the present invention. In order to auto-set DTV audio configuration, a DTV installation type may be input.

A user may input a DTV installation type intentionally, or a user who is not familiar with the process may be guided to input a DTV installation type. Each exemplary case will be explained in detail.

(1) If a User Inputs a DTV Installation Type Intentionally

As illustrated in FIG. 2, if a user requests 'an input menu for DTV installation type' (S205-Y), the control unit 150 controls the GUI generation unit 160 so that the input menu for DTV installation type may be displayed on the display (S210).

Figure 3:
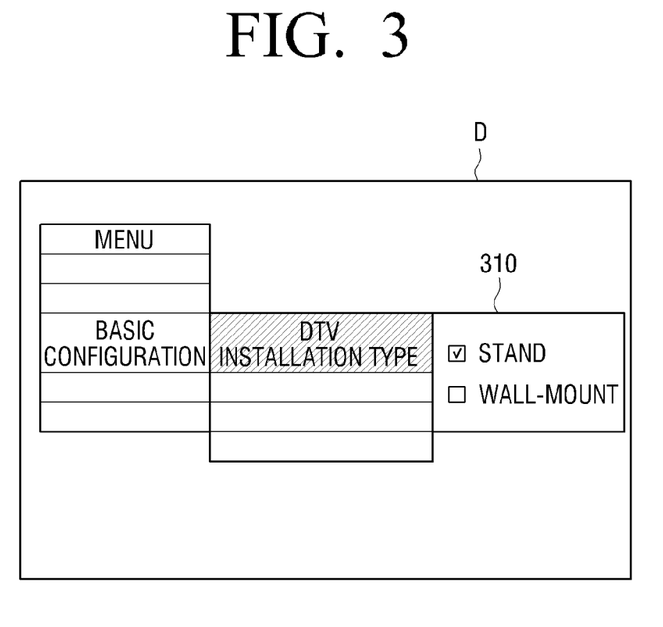
FIG. 3 is a view illustrating an exemplary input menu for DTV installation type which may appear on a display upon a user's request, according to an exemplary embodiment of the present invention.

FIG. 3 illustrates an exemplary DTV installation type input menu 310 displayed on the display D according to the user's request. According to FIG. 3, a user may request the DTV installation type input menu 310 by manipulating a menu. In addition, according to FIG. 3, a user may input an installation type, such as a stand type or a wall-mount type of DTV installation type using a check box.

If, for example, a stand type is input as a DTV installation type via the DTV installation type input menu provided in S210 (S215-Y), the control unit 150 sets the output configuration of the DTV audio to PEQ-S (S220).

PEQ-S is a PEQ setting value appropriate for a stand type, and the control unit 150 may control the audio processing unit 125 and/or the audio output unit 131 so that the audio is output according to PEQ-S.

If, for example, a wall-mount type is input as a DTV installation type via the DTV installation type input menu provided in S210 (S225-Y), the control unit 150 sets the output configuration of the DTV audio to PEQ-W (S230).

PEQ-W is a PEQ setting value appropriate for a wall-mount type, and the control unit 150 may control the audio processing unit 125 and/or the audio output unit 131 so that the audio is output according to PEQ-W.

(2) If a User is Guided to Input a DTV Installation Type Via a Pop-Up Window

If, for example, power is turned on after a power plug of a DTV is removed from an outlet and connected, (S235-Y) or if a user requests 'an audio menu' for the first time (S240-Y), the control unit 150 may control the GUI generation unit 160 so that an input menu for DTV installation type is displayed on a display in a pop-up or another type of window (S245).

In S245, the input menu for DTV installation type is displayed in, for example, a pop-up window as the user did not request an input menu for DTV installation type directly.

Figure 4:
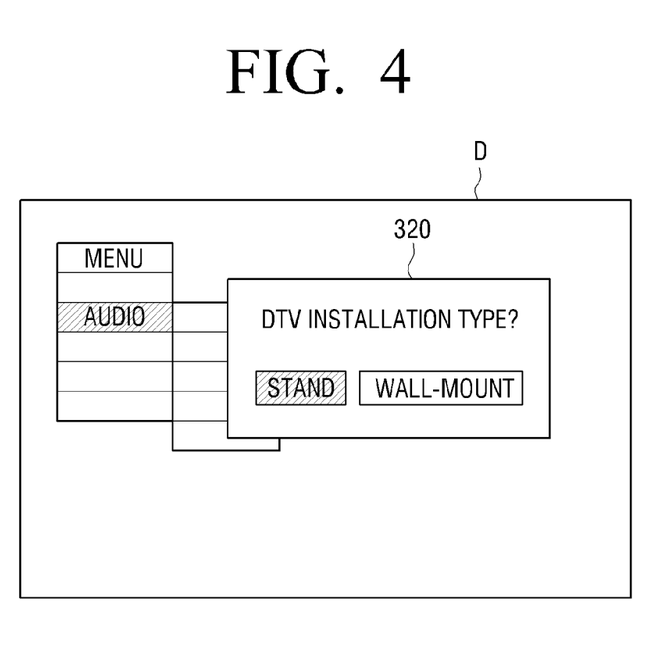
FIG. 4 is a view illustrating an exemplary input menu for DTV installation type which may appear on a display in a pop-up window, according to an exemplary embodiment of the present invention.

FIG. 4 illustrates an exemplary DTV installation type input menu 320 which may be displayed on the display in a pop-up window in S245, according to an exemplary embodiment.

If it is determined that there is a problem in outputting audio of the DTV or a user wishes to adjust or change the sound quality or other sound-related aspects of the DTV, a user may request an audio menu. The DTV installation type input menu 320 may be displayed in a pop-up window when the user requests the audio menu, and the DTV may lead the user to set a PEQ appropriate for the DTV installation type. This pop-up in response to a request for an audio menu may be particularly effective as the user may not know that the DTV installation type may be input via a DTV installation type input menu.

In an exemplary embodiment of the present invention, the DTV installation type input menu is displayed in a pop-up window only when the user requests an audio menu "for the first time" to let the user know the above function, as if the DTV installation type input menu is displayed in a pop-up window every time the audio menu is requested, the user may experience inconvenience.

If a power plug of a DTV is removed from an outlet and connected again, it is probable that the installation type of the DTV may have changed, since a user tends to change a DTV installation type after removing the power plug of the DTV from the outlet.

In this case, the DTV installation type input menu may be displayed in a pop-up window to guide a user to set a PEQ appropriate for the DTV installation type. In addition, the DTV installation type input menu is displayed in a pop-up window only when power is turned on "for the first time" after the power cord is reconnected, so that the number of the DTV installation type input menu being provided without request may be minimized.

After S245, S215 to S230 are performed. Since these operations have already been explained above, the detailed description will be omitted.

(3) If a DTV Installation Type is Input Via a Guide Screen

If power of a DTV is turned on for the first time after, for example being shipped out of the factory or post-delivery (S250-Y), or the DTV is set to a self diagnosis mode (S255-Y), the control unit 150 may control the GUI generation unit 160 so that 'an initialization guide screen' or 'a self diagnosis guide screen' including a DTV installation input menu is displayed on a display (S260).

If a DTV is turned on for the first time after being shipped out of the factory (that is, if the DTV is changed from a factory mode to a user mode), a DTV installation type may not have been set yet. Accordingly, the DTV installation type input menu may be included in 'the initialization guide screen' to guide a user to input a DTV installation type.

If it is determined that there is problem in outputting audio of a DTV or a user wishes to adjust or change the sound quality or other sound-related aspects of the DTV, a user may try to adjust the DTV via the self diagnosis mode. Accordingly, the DTV installation type input menu is included in 'the self diagnosis guide screen' to naturally guide a user to check a DTV installation type.

After S260, S215 to S230 are performed. Since these operations have already been explained above, the detailed description will be omitted.

3. Exemplary Embodiments of the Present Invention (1) Select a PEQ Setting Value In the above exemplary embodiment of the present invention, a PEQ setting value is set for each DTV installation type, but this is only an example.

A plurality of PEQ setting values appropriate each of the DTV installation type may be set. For instance, PEQ-W1, PEQ-W2, and PEQ-W3 may be set as PEQ setting values for a wall-mount type. In this case, the wall-mount type is input as a DTV installation type, and one of the setting values may be set as audio output configuration, based on, for example, user preference, a listening environment, a type of content to display, or other environmental factors.

A user may select which one of PEQ-W1, PEQ-W2, and PEQ-W3 will be set as the audio output configuration based on, for example, displayed information, the listening environment, or outputted audio. According to an exemplary embodiment, in order to help the user's selection, the DTV may output audio, and if the user confirms the output, the DTV may set the audio output configuration according to the PEQ setting value selected by the user.

(2) Obtain a PEQ Setting Value

The PEQ setting values that a DTV has in the storage unit 180 may be obtained in various ways. For example, they may be stored in the storage unit 180 before being shipped out of the factory, after the broadcast reception unit 110 receives them via a broadcast reception medium (over the air, through cable, or etc.), after being received via a network connected to the external interface 170, after being received via an external apparatus connected to the external interface 170, or after being received from a storage medium connected to the external interface 170.

(3) Set DTV Output Configuration Automatically Based on DTV Installation "Status"

In an exemplary embodiment, a DTV installation type is input by a user, but this is only an example. Other information than the DTV installation type may be input by the user, and audio output configuration of the DTV may be set based on this information.

Figure 5:
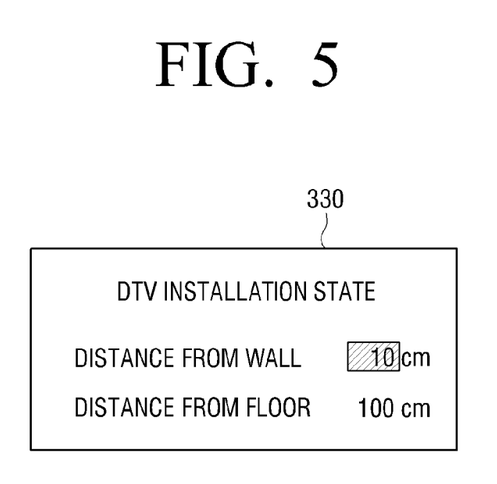
FIG. 5 illustrates an example of 'an input menu of the distance between a DTV and a wall/floor 330,' according to an exemplary embodiment.

For instance, DTV installation state rather than a DTV installation type may be input by the user, and the audio output configuration of the DTV may be set based on the DTV installation state input by the user. The DTV installation state may be information such as 'a distance between the DTV and the wall' and 'a distance between the DTV and the floor.' FIG. 5 illustrates an example of 'an input menu of the distance between a DTV and a wall/floor 330,' according to an exemplary embodiment.

According to aspects of an exemplary embodiment, only one of a distance between the DTV and the wall (or other mounting surface) and a distance between the DTV and the floor (or other surface) may need to be input.

(4) Sense DTV Installation Type/State Automatically

According to aspects of exemplary embodiments, it may be possible to sense a DTV installation type automatically, other than by a user's input, and to set DTV audio output configuration based on the sensed DTV installation type.

In order for this, exemplary embodiments may utilize a sensor or a switch to sense whether a stand is connected to the DTV, and a sensor or a switch to detect whether a wall-mount is connected to the DTV, or other types of distance, audio, position, or other sensors to detect an installation type.

Accordingly, aspects of exemplary embodiments may make it possible to sense DTV installation state automatically, not by a user's input, and to set DTV audio output configuration based on the sensed DTV installation status.

(5) Others

In the above exemplary embodiment, a menu represents an example of a GUI. Accordingly, the present invention may also be applied when the DTV install type input menu is provided as a GUI for inputting a DTV installation type in another format.

In addition, aspects of exemplary embodiments of the present invention may be applied to other kinds of TV than a DTV, displays, or other apparatuses that may output audio.

In some of the above exemplary embodiments, a DTV audio output configuration is set based on a DTV installation type, but this is only an example. Accordingly, aspects of exemplary embodiments of the present invention may be applied when a different DTV configuration other than DTV audio output configuration is set based on a DTV installation type.

According to aspects of exemplary embodiments, a wall-mount type and a stand type are examples of a DTV installation type, and a DTV installation type may include other types of installations (as non-limiting examples: a ceiling-mount type, floor-mount type, outdoor display, a large room installation, a small room installation, and underwater installation).

As in the above description, according to aspects of exemplary embodiments of the present invention, TV configuration may be set automatically based on a TV installation type input via a GUI, and thus an TV configuration may be set automatically based only on the TV installation type.

Although a few exemplary embodiments of the present invention have been shown and described, it would be appreciated by those skilled in the art that changes may be made in this embodiment without departing from the principles and spirit of the invention, the scope of which is defined in the claims and their equivalents. Additionally, expressions such as "at least one of", when preceding a list of elements, modify the entire list of elements and do not modify each element of the list.

What is claimed is:

1. A method of controlling a display apparatus having an audio processing unit, the method comprising:

in response to the display apparatus being in a user mode, displaying a Graphical User Interface (GUI) pop up menu to receive a first user input for a user to select a stand installation or a wall-mount installation only if 1) the display apparatus is turned on for a first time after a power plug of the display apparatus is removed from power and is connected to the power again and 2) if the user requests a GUI regarding audio for a first time by selecting an audio menu GUI for the first time;

displaying, automatically without any user input, an initialization guide screen in response to the display apparatus being in a factory mode and turned on for a first time after being shipped out of a factory;

displaying a self-diagnosis guide screen including an installation type input menu to adjust or change a sound quality of the display apparatus in response to the display apparatus being in a self-diagnosis mode;

setting an audio output configuration according to at least one audio output configuration setting value designated for the stand installation or the wall-mount installation selected via the GUI pop up menu;

if the stand installation is selected through the GUI pop up menu, controlling the audio processing unit to process an audio signal according to an audio configuration for the stand installation; and if the wall-mount installation is selected through the GUI pop up menu, controlling the audio processing unit to process an audio signal according to an audio configuration for the wall-mount installation,
wherein the GUI pop up menu further comprises a menu item to receive a user input to select a ceiling-mount installation.

2. The method as claimed in claim 1, wherein a sound wave output by a speaker when the audio processing unit is controlled according to the audio configuration for the stand installation is different from the sound wave output by the speaker when the audio processing unit is controlled according to the audio configuration for the wall-mount installation.

3. The method as claimed in claim 2, wherein the audio output configuration comprises Parametric EQualization (PEQ) information.

4. The method as claimed in claim 2, wherein an audio output configuration setting value of the stand installation or the wall-mount installation is stored in the display apparatus before being shipped out of a factory, after being received via a broadcast reception medium, after being received via a network connected to the display apparatus, after being received from an external apparatus connected to the display apparatus, or after being received from a storage medium connected to the display apparatus.

5. The method as claimed in claim 2, further comprising:
sensing a display apparatus installation type; and
setting the audio output configuration of the display apparatus based on the sensed display apparatus installation type.

6. The method as claimed in claim 1, wherein the setting of the audio configuration further comprises:
outputting an audio according to a first audio output configuration setting value selected by the user from among the at least one audio output configuration setting value designated for the stand installation or the wall-mount installation, input via the GUI pop up menu; and
setting the audio output configuration according to the first audio output configuration setting value selected by the user, if the user confirms the outputted audio.

7. A display apparatus, comprising:
a memory comprising computer executable instructions;
at least one hardware processor configured to read and execute the computer executable instructions, the computer executable instructions causing the display apparatus to perform:
processing an image signal by a video processing unit;
processing an audio signal by an audio processing unit;
in response to the display apparatus being in a user mode, displaying a graphical user interface (GUI) pop up menu displayed on a display to receive a first user input for a user to select a stand installation or a wall-mount installation only if 1) the display apparatus is turned on for a first time after a power plug of the display apparatus is disconnected from power and is connected to the power again and 2) if the user requests a GUI regarding audio for a first time by selecting an audio menu GUI for the first time;
displaying, automatically without any user input, an initialization guide screen in response to the display apparatus being in a factory mode and turned on for a first time after being shipped out of a factory;
displaying a self-diagnosis guide screen including an installation type input menu to adjust or change a sound quality of the display apparatus in response to the display apparatus being in a self-diagnosis mode; and
controlling the audio processing unit such that if the user selects the stand installation through the GUI pop UP menu, the audio processing unit processes the audio signal according to an audio configuration for the stand installation, and if the user selects the wall-mount installation through the GUI pop up menu, the audio processing unit processes the audio signal according to an audio configuration for the wall-mount installation;
a display configured to display an image corresponding to the image signal processed by the video processing unit; and
a speaker configured to output a sound wave corresponding to the audio signal processed by the audio processing unit,
wherein at least one audio output configuration setting value is designated for the stand installation or the wall-mount installation,
wherein the audio output configuration is set according to the at least one audio output configuration setting value designated for the stand installation or the wall-mount installation selected through the GUI pop up menu, and
wherein the GUI pop up menu further comprises a menu item to receive a user input to select a ceiling-mount installation.

8. The display apparatus as claimed in claim 7, wherein the sound wave output by the speaker when the audio processing unit is controlled according to the audio configuration for the stand installation is different from the sound wave output by the speaker when the audio processing unit is controlled according to the audio configuration for the wall-mount installation.

9. The display apparatus as claimed in claim 8, wherein the audio output configuration setting value for the stand installation or the wall-mount installation is stored in the display apparatus before being shipped out of a factory, after being received via a broadcast reception medium, after being received via a network connected to the display apparatus, after being received from an external apparatus connected to the display apparatus, or after being received from a storage medium connected to the display apparatus.

10. A method for configuring an audio output of a display apparatus, the method comprising:
in response to the display apparatus being in a user mode, receiving installation information from a user, via a graphical user interface (GUI) pop up menu displayed on the display apparatus only if 1) the display is turned on for a first time after a power plug of the display is removed from power and is connected to the power again and 2) if the user requests a GUI regarding audio for a first time by selecting an audio menu GUI for the first time;
displaying, automatically without any user input, an initialization guide screen in response to the display apparatus being in a factory mode and turned on for a first time after being shipped out of a factory;
displaying a self-diagnosis guide screen including an installation type input menu to adjust or change a sound quality of the display apparatus in response to the display apparatus being in a self-diagnosis mode; and
selecting an audio output configuration based on the installation information received from the user, wherein the installation information comprises information indicating the display being one of ceiling-mounted; wall-mounted; or stand-mounted,
wherein at least one audio output configuration setting value is designated for the stand-mounted display, the wall-mounted display, or the ceiling-mounted display, and wherein the selecting audio output configuration comprises setting the audio output configuration according to the at least one audio output configuration setting value designated for the stand-mounted display, the wall-mounted display, or the ceiling-mounted display.

11. The method of claim 10,
wherein the selecting the audio output configuration further comprises:
outputting a first audio output according to the installation information received from the user;
setting the audio output configuration according to the first audio output, if the user approves the first audio output;
outputting a second audio output, if the user disapproves the first audio output; and
setting the audio output configuration according to the second audio output, if the user approves the second audio output.

* * * * *